(12) United States Patent
Kordel

(10) Patent No.: US 9,409,496 B2
(45) Date of Patent: Aug. 9, 2016

(54) SEAT CONFIGURED FOR OCCUPANCY STATE DETECTION

(71) Applicant: IEE INTERNATIONAL ELECTRONICS & ENGINEERING S.A., Echternach (LU)

(72) Inventor: Markus Kordel, Trier (DE)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 14/400,238

(22) PCT Filed: May 6, 2013

(86) PCT No.: PCT/EP2013/059329
§ 371 (c)(1),
(2) Date: Nov. 10, 2014

(87) PCT Pub. No.: WO2013/167504
PCT Pub. Date: Nov. 14, 2013

(65) Prior Publication Data
US 2015/0123806 A1 May 7, 2015

(30) Foreign Application Priority Data
May 10, 2012 (LU) .......................................... 91996

(51) Int. Cl.
*B60N 2/00* (2006.01)
*G08B 21/22* (2006.01)
*B60N 2/70* (2006.01)
(Continued)

(52) U.S. Cl.
CPC .............. *B60N 2/002* (2013.01); *B60N 2/7094* (2013.01); *B60N 2/72* (2013.01); *B60R 21/01512* (2014.10); *G08B 21/22* (2013.01)

(58) Field of Classification Search
None
See application file for complete search history.

(56) References Cited

U.S. PATENT DOCUMENTS 2,818,477 A * 12/1957 Gollhofer .................... 200/85 R
3,703,618 A * 11/1972 Lewis ........................ 200/85 A
(Continued)

FOREIGN PATENT DOCUMENTS

FR 2131676 A5 11/1972
FR 2844592 A1 3/2004
(Continued)

OTHER PUBLICATIONS

International Search Report issued Aug. 5, 2013 re: Application No. PCT/EP2013/059329; citing: FR 2 852 273 A1, FR 2 131 676 A5 and US 2007/028702 A1.
(Continued)

*Primary Examiner* — Fekadeselassie Girma
*Assistant Examiner* — Chico A Foxx
(74) *Attorney, Agent, or Firm* — Reising Ethington P.C.

(57) ABSTRACT

A seat (10) configured for detecting an occupancy state comprises an at least partially electrically conductive structural frame (14) comprising at least two fixation sites (22, 24) and an at least partially electrically conductive cushion-supporting spring (20) taut between the fixation sites. The cushion-supporting spring is electrically insulated from the structural frame. The seat comprises a cushion (16) supported by the cushion-supporting spring. The cushion-supporting spring and the structural frame are disposed in such a way that they are brought in electrical contact with each other when a force (34) is applied on the cushion that exceeds a predefined threshold force.

13 Claims, 2 Drawing Sheets

(51) Int. Cl.
*B60N 2/72* (2006.01)
*B60R 21/015* (2006.01)

(56) References Cited

U.S. PATENT DOCUMENTS

| | | | |
|---|---|---|---|
| 3,772,644 A * | 11/1973 | Hanselmann et al. | 340/438 |
| 3,946,178 A * | 3/1976 | Eberle et al. | 200/85 A |
| 4,075,443 A * | 2/1978 | Fatur | 200/85 A |
| 5,124,512 A * | 6/1992 | Huettner et al. | 200/85 A |
| 6,161,070 A * | 12/2000 | Jinno et al. | 701/45 |
| 6,359,245 B1 * | 3/2002 | Wahls | 200/52 R |
| 6,364,352 B1 * | 4/2002 | Norton | G01G 19/4142 280/735 |
| 7,523,803 B2 | 4/2009 | Breed | |
| 7,916,019 B2 * | 3/2011 | Vial et al. | 340/545.1 |
| 7,953,522 B2 * | 5/2011 | Takai et al. | 701/1 |
| 8,025,119 B2 * | 9/2011 | Nemec et al. | 180/273 |
| 8,183,484 B2 * | 5/2012 | Niguet et al. | 200/330 |
| 2005/0022615 A1 * | 2/2005 | Fortune et al. | 73/862.382 |
| 2006/0218843 A1 * | 10/2006 | Sanchez et al. | 43/17 |
| 2007/0025702 A1 | 2/2007 | Khan et al. | |
| 2008/0094239 A1 * | 4/2008 | Vial et al. | 340/686.1 |
| 2008/0191527 A1 * | 8/2008 | Takai et al. | 297/217.3 |
| 2011/0163767 A1 * | 7/2011 | Chen et al. | 324/679 |
| 2011/0221459 A1 * | 9/2011 | Uno et al. | 324/713 |
| 2012/0267928 A1 * | 10/2012 | Mankame et al. | 297/284.4 |
| 2012/0299605 A1 * | 11/2012 | Wakabayashi et al. | 324/679 |
| 2014/0246887 A1 * | 9/2014 | Clos et al. | 297/217.3 |

FOREIGN PATENT DOCUMENTS

| | | |
|---|---|---|
| FR | 2852273 A1 | 9/2004 |
| GB | 1467769 A | 3/1977 |
| LU | 91701 A | 12/2011 |
| WO | 2005108160 A1 | 11/2005 |

OTHER PUBLICATIONS

Written Opinion issued May 5, 2013 re: Application No. PCT/EP2013/059329; citing: FR 2 852 273 A1.

* cited by examiner

SEAT CONFIGURED FOR OCCUPANCY STATE DETECTION

TECHNICAL FIELD

The present invention generally relates to a seat, in particular a vehicle seat, configured for detecting an occupancy state.

BACKGROUND ART

Vehicle seats typically comprise a metal structural frame and metal cushion-supporting springs supporting a cushion. Usually, the cushion-supporting springs consist of specially formed metal wires, which provide a suspension or cushioning effect. The cushion-supporting springs are linked to the metal structural frame by hook-shaped ends, which are coated with plastic. The plastic coating prevents a metallic contact between the cushion-supporting springs and the structural frame. Thereby, undesired squeak noises are avoided. An example for a vehicle seat of this type is disclosed in document WO2005/108160.

Furthermore, vehicle seats configured for detecting their occupancy state (i.e. "empty" or "occupied") are known. Such seats are used, for example, in combination with seat belt reminder systems and for deactivating the passenger airbags if the seats are not occupied. Such seats generally comprise one or more pressure or proximity sensors. In document GB 1 467 769, load-sensitive switches are arranged on top of the cushion directly under a seat cover of the seat. In document FR 2 844 592 A1, the cushion-supporting suspension mats of the seat base and the seat back are used as the electrodes of a capacitive occupancy detection system. The electrodes are arranged below the cushion at the so-called "B-side" surface of the seat. In documents LU 91701 and U.S. Pat. No. 7,523,803, a tension sensor is arranged between the cushion-supporting spring and the structural frame to measure a mechanical tension between them or an elongation of the spring displacement.

BRIEF SUMMARY

The invention provides a seat configured for detecting an occupancy state, which is more cost efficient and easier to manufacture and to assemble.

The present invention proposes a seat, in particular a vehicle seat, configured for detecting an occupancy state. The seat comprises an at least partially electrically conductive structural frame comprising at least two fixation sites and an at least partially electrically conductive cushion-supporting spring taut between the fixation sites. The cushion-supporting spring is electrically insulated from the structural frame. The seat further comprises a cushion (at least partly) supported by the cushion-supporting spring. The cushion-supporting spring and the structural frame are disposed in such a way that they are brought in electrical contact with each other when a force is applied on the cushion that exceeds a predefined threshold force.

The threshold force is the force above which the seat is detected occupied, i.e. the occupancy state is "occupied". The occupied state is may e.g. be detected when an adult human is seated on the seat, but not when the seat carries a child in a child restraint system or a small object, like a parcel. Accordingly, the threshold force is preferably defined as the force exerted on the seat by a normally seated $5^{th}$ percentile female. Nevertheless, it shall be noted that the threshold force will be selected in accordance with the needs of the application and of the type of occupancy to be detected. Therefore, the threshold force may be lower or higher than the weight of a $5^{th}$ percentile female.

The seat can comprise a plurality of cushion-supporting springs, which form a cushion-supporting mat that supports the cushion. Optionally, the cushion-supporting springs can be pin-joint by plastic links. The plastic links transmit pulling forces between the cushion supporting springs and participate in supporting the cushion.

As will be appreciated, the cushion-supporting springs and the structural frame are little or not influenced by the design of the seat parts that can be readily perceived by the user (such as e.g. the shape of the cushion and the upholstery of the seat). For a particular car model, the cushion-supporting springs and the structural frame are normally defined only once, namely at the moment of the seat design. The structural frame being a part of a car's passive safety concept, it will not be changed after the passive safety concept of a vehicle has been defined. As this happens at an early stage in the development of a car model, the supplier of the seat as claimed gains more time for making adjustments in design, if necessary.

Preferably, the cushion-supporting spring and the structural frame are (directly or indirectly) connected to a detection device configured for detecting the electrical contact between the cushion-supporting spring and the structural frame. The detection device can be part of an information treatment device (e.g. an onboard computer or a safety bag inflating apparatus) or be (directly or indirectly) connected to such an information treatment device for transmitting information about the electrical contact to the information treatment device. The detection device can be of very simple construction. The detection device can e.g. comprise an ohmmeter, a voltmeter and/or an ammeter or be configured to operate as an ohmmeter, a voltmeter and/or an ammeter.

When a force is applied on the cushion, the cushion-supporting spring elongates between the fixation points and bends downward. If the applied force is high enough, the cushion-supporting spring touches the structural frame and thus establishes an electrical contact.

Preferably, the structural frame comprises a first contact area and the cushion-supporting spring comprises a second contact area arranged facing the first contact area. The electrical contact is thus established between the first and the second contact areas.

Thanks to the features of the invention, one takes benefit of the presence of the structural frame and the cushion-supporting spring, which are in any case comprised in a modern seat, to detect the occupancy state of the latter. That permits simplifying the seat construction and reducing the costs of a seat. In particular, the seat according to the invention does not require any further specific occupant-sensing device, e.g. on the upper surface of the seat cushion). Furthermore, it will be appreciated that the invention does not deteriorate the occupant's seating comfort.

In a preferred embodiment of the invention, the cushion-supporting spring is a flat spring, a cable, a wire, or the like. The cushion-supporting spring is preferably continuous between the fixation sites. The second contact area may be located between the two fixation sites.

Preferably, one or both of the first and second contact areas comprise a contact protrusion. The contact protrusion can be adjustable to achieve a desired threshold force. There are several possibilities to achieve a mechanically adjustable contact protrusion. The contact protrusion can e.g. comprise a screw. In another embodiment, the contact protrusion can be a divisible device i.e. a protrusion with a plurality of notches allowing it to be cut or pinched off at the required length. In a yet another embodiment, the contact protrusion can be a bent-up portion of the structural frame. The contact protrusion can be resilient in order to maintain its adjustment even if the contact force between said cushion-supporting spring and said structural frame is important.

The detection device can be directly or indirectly electrically connected with the first and/or the second contact area.

In a preferred embodiment, the cushion-supporting spring is electrically insulated from the structural frame by the interposition of an insulating material such as a plastic. The cushion-supporting spring can be partially coated with plastic, e.g. at the fixation points.

The cushion-supporting spring can be fixed to the structural frame by hooks arranged at the ends of the cushion-supporting spring. In this case, the fixation sites of the structural frame are shaped in such a way that the hooks may engage them. The hooks could pass around a beam of the structural frame or be engaged in an eyelet provided on the structural frame.

A further aspect of the present invention regards a vehicle comprising a seat as described hereinabove. The detection device can be configured for detecting the electrical contact by comparing an electrical potential of the cushion-supporting spring with the electrical reference potential of the vehicle body. The detection device and the structural frame can be electrically connected with the vehicle body.

BRIEF DESCRIPTION OF THE DRAWINGS

Preferred embodiments of the invention will now be described, by way of example, with reference to the accompanying drawings, in which.

Throughout the drawings, the same or similar elements are designated with the same reference numbers. It should also be noted that the drawings are not to scale.

DESCRIPTION OF PREFERRED EMBODIMENTS

Figure 1:
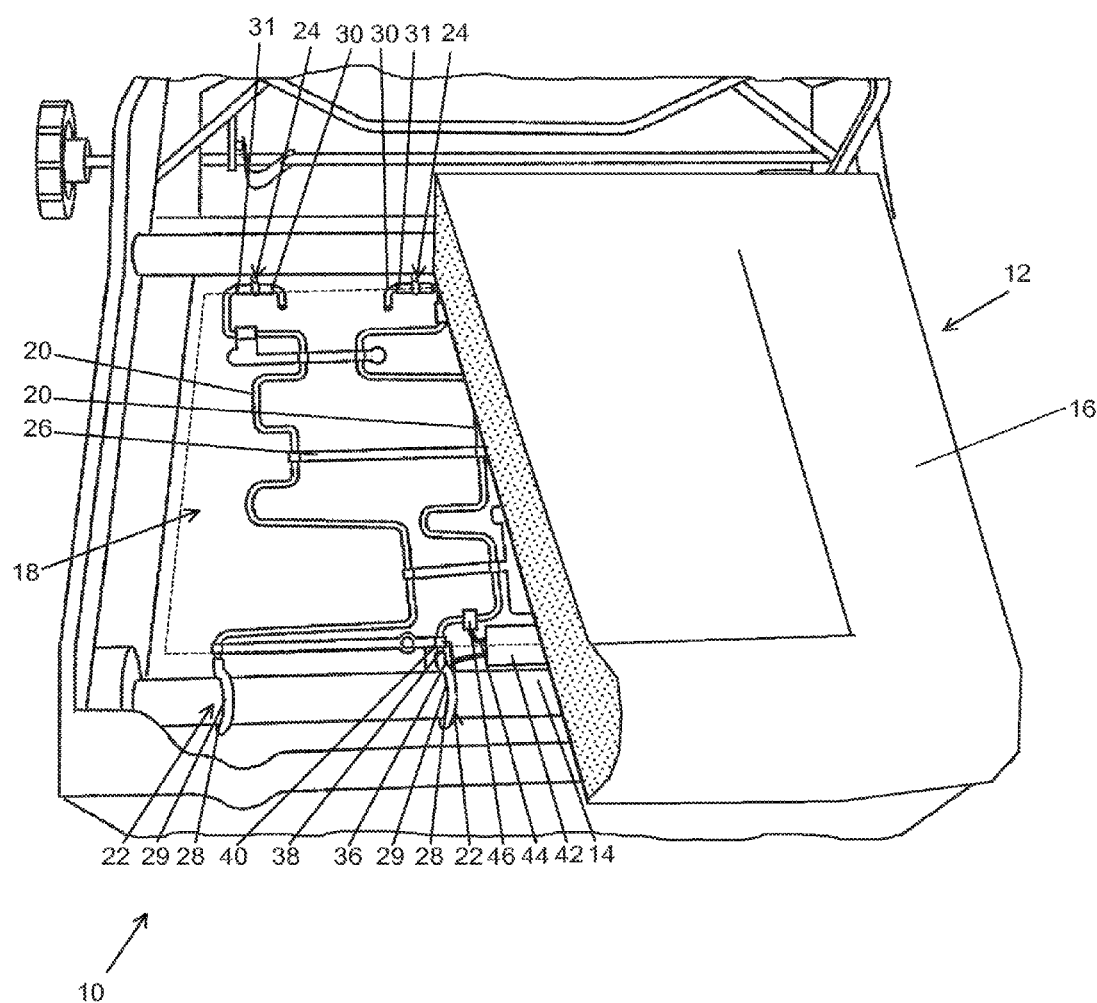
FIG. 1 is a perspective view of a seat according to a first embodiment of the invention.

A vehicle seat 10 according to a preferred embodiment of the invention is generally shown in FIG. 1. The vehicle seat 10 comprises backrest (not shown) and a seating portion 12. The seating portion 12 comprises a structural frame 14 and a cushion 16, e.g. made of foam, which rests on a cushion-supporting mat 18. The cushion-supporting mat 18 comprises a plurality of cushion-supporting springs 20, each taut between two fixation sites 22, 24 provided on the structural frame 14.

The cushion-supporting springs 20 are bent into a staggered shape so as to define an essentially flat and resilient support for the cushion 16.

The springs are interconnected by cross-links 26, e.g. made of plastic. The cross-links 26 transmit pulling forces between the cushion-supporting springs 20 and participate in the elastic suspension of the cushion 16. The springs 20 have hook-shaped end portions 28, 30 engaging with the fixation sites 22 and 24, respectively. The hook-shaped end portions 28, 30 are covered with plastic coatings 29, 31 in order to avoid undesired squeak noises due to friction between the structural frame 14 and the springs 20.

The cushion-supporting springs 20 and the structural frame 14 are made of metal, e.g. steel. An effect of the plastic coatings 29, 31 of the spring end portions 28, 30 is that the springs 20 are insulated from the structural frame 14. In accordance with the invention, at least one of the cushion-supporting springs 20 is configured in such a way that an electrical contact is established between the cushion-supporting spring 20 and the structural frame 14 when the seat 10 is occupied.

Figure 2:
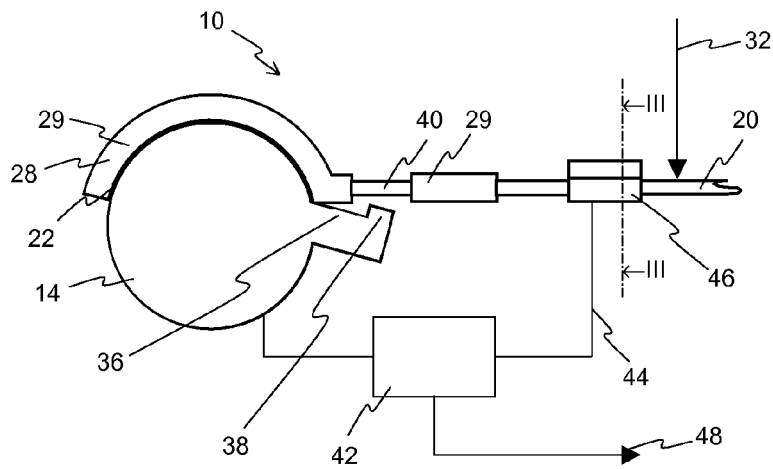
FIG. 2 is a schematic detail of a seat according to the first embodiment of the invention.
Figure 4:
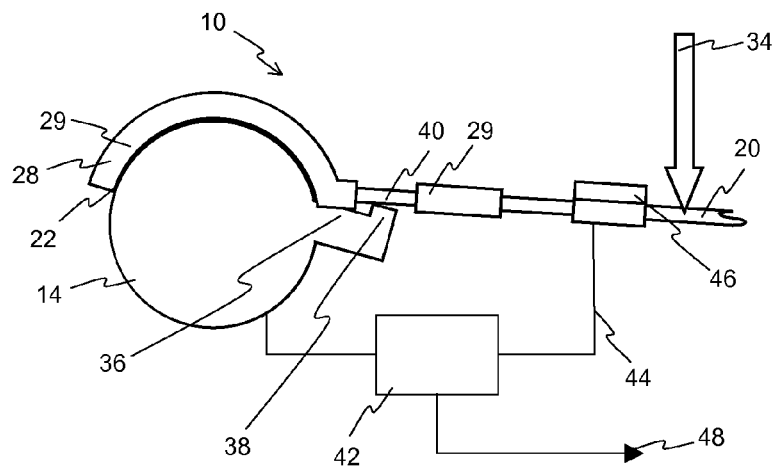
FIG. 4 is a schematic detail of the seat according to the first embodiment of the invention when a pressure is applied on the cushion.

As best shown in FIGS. 2 and 4, an occupant seated on the seat 10 causes the cushion-supporting springs 20 to bend downward. FIG. 2 shows the connection between the cushion-supporting spring 20 and the structural frame 14 when the seat 10 is empty, i.e. when no significant external load (illustrated by the small arrow 32) is exerted on the cushion 16. FIG. 4 shows the same connection when the seat 10 is occupied by a person, whose weight exceeds the predefined threshold force (e.g. the weight of a $5^{th}$ percentile female). Solid arrow 34 indicates the increased force transferred on the cushion-supporting spring 20 due to the weight of the occupant. The structural frame 14 comprises a contact protrusion 36 that forms a first contact area 38, while the plastic coating 29 of the hook-shaped end portion 28 of the spring 20 has an opening that makes accessible a second contact area 40 on the spring 20. When the cushion-supporting spring 20 bends under the weight of the occupant, the first and second contact areas 38, 40 enter into electrical contact with each other.

Figure 3:
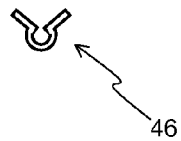
FIG. 3 is cross-sectional view of the clip of FIG. 2 that connects the detection device with the cushion-supporting spring.

A detection circuit 42 is electrically connected with the first contact area 38 and the second contact area 40 in order to detect any electrical contact between them. Specifically, the detection circuit 42 may be connected with the cushion-supporting spring 20 by means of a cable 44 and a clip 46 (illustrated in FIG. 3). The detection circuit 42 comprises an output 48 for outputting a signal indicative of whether the seat 10 is occupied or not to the vehicle's onboard computer and/or to a seat belt reminder device.

As will be appreciated, the cushion 16 arranged on the cushion-supporting mat 18 hides the detection circuit 42 and the connections, so the user cannot readily perceive them.

Figure 5:
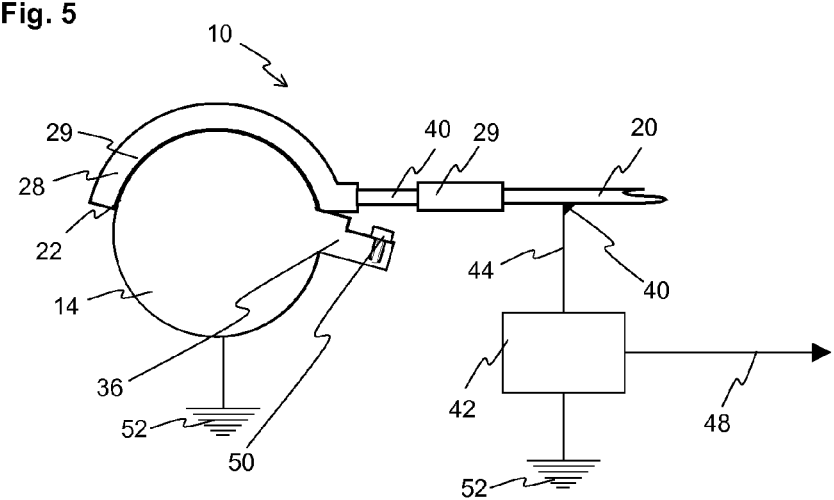
FIG. 5 is a side view of a detail of a seat according to a second embodiment of the invention.

FIG. 5 shows a further embodiment according to the invention. This embodiment differs from the precedent embodiment in that the contact protrusion 36 is adjustable and in that the detection circuit 42 is connected in a different way. The contact protrusion 36 is adjustable thanks to a screw 50, which allows changing the amount of bending of the spring 20 required for the first and second contact areas to be brought into contact and thus permits to adjust the threshold force.

In the embodiment of FIG. 5, the detection circuit 42 is connected to the cushion-supporting spring 20 and to the vehicle body 52. The structural frame 14 of the seat is electrically connected to the vehicle body 52 by seat fixation means (not shown). The detection circuit 42 may be configured to compare the electric potential of the vehicle body 52 with the electric potential of the cushion-supporting spring 20 to detect an electrical contact between the cushion-supporting spring 20 and the structural frame 14.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A seat configured for detecting an occupancy state, comprising:
    an at least partially electrically conductive structural seat frame comprising
        at least two fixation sites,
        a contact protrusion protruding from the seat frame and having an end, the contact protrusion comprising a first electrical contact area that extends off the end of the contact protrusion;
    one or more at least partially electrically conductive cushion-supporting springs taut between said fixation sites across said structural seat frame and electrically insulated from said structural seat frame, wherein the one or more cushion-supporting springs each comprises an opening formed in the electrical insulation, the opening exposing a conductive part of the respective cushion-supporting spring and forming a second electrical contact area on the respective cushion supporting spring; and
    a seat cushion supported by said one or more cushion-supporting springs, wherein the one or more cushion supporting springs are linked to the structural seat frame using electrically insulated coupling ends,
    wherein said one or more cushion-supporting springs and said structural seat frame are structured in such a way that the first electrical contact area and the second electrical contact area are brought into electrical contact with each other when an occupancy force applied on said cushion exceeds a predefined threshold force, wherein the electrical contact is detectable for detecting said occupancy state.

2. The seat as claimed in claim 1, wherein said cushion-supporting spring and said structural seat frame, are connected to a detection device configured for detecting said electrical contact between said first electrical contact area and said second electrical contact area.

3. The seat as claimed in claim 2, wherein said detection device is part of an information treatment device or configured for being connected with an information treatment device for transmitting information about said electrical contact to said information treatment device.

4. The seat as claimed in claim 2, wherein said detection device is electrically connected with said second electrical contact area.

5. The seat as claimed in claim 2, wherein said detection device is electrically connected with said first electrical contact area.

6. The seat as claimed in claim 3, wherein said detection device comprises or is configured to operate as at least one of an ohmmeter, a voltmeter and an ammeter.

7. The seat according to claim 3, wherein the information treatment device comprises an onboard computer or a safety bag inflating apparatus.

8. The seat as claimed in claim 1, wherein said contact protrusion is mechanically adjustable in accordance with a desired threshold force.

9. The seat as claimed in claim 1, wherein said contact protrusion is resilient.

10. The seat as claimed in claim 1, wherein said one or more cushion-supporting springs are electrically insulated from said structural frame by a plastic material.

11. A vehicle comprising a seat configured for detecting an occupancy state, comprising:
    an at least partially electrically conductive structural seat frame comprising
        at least two fixation sites,
        a contact protrusion protruding from the seat frame and having an end, the contact protrusion comprising a first electrical contact area that extends off the end of the contact protrusion;
    one or more at least partially electrically conductive cushion-supporting springs taut between said fixation sites across said structural seat frame and electrically insulated from said structural seat frame, wherein the one or more cushion-supporting springs each comprises an opening formed in the electrical insulation, the opening exposing a conductive part of the respective cushion-supporting spring and forming a second electrical contact area on the respective cushion supporting spring; and
    a seat cushion supported by said one or more cushion-supporting springs, wherein the one or more cushion supporting springs are linked to the structural seat frame using electrically insulated coupling ends,
    wherein said one or more cushion-supporting springs and said structural seat frame are structured in such a way that the first electrical contact area and the second electrical contact area are brought into electrical contact with each other when an occupancy force applied on said cushion exceeds a predefined threshold force, wherein the electrical contact is detectable for detecting said occupancy state.

12. A vehicle comprising a seat, as claimed in claim 2, a vehicle body at an electrical. reference potential, and wherein said detection device is configured for detecting said electrical contact by comparing an electrical potential of said one or more cushion-supporting springs with said electrical reference potential of said vehicle body.

13. The vehicle as claimed in claim 12, wherein said detection device and said structural seat frame are electrically connected with said vehicle body.

* * * * *